(12) United States Patent
Kondoh

(10) Patent No.: US 8,908,824 B2
(45) Date of Patent: Dec. 9, 2014

(54) IMAGING APPARATUS

(75) Inventor: Takeshi Kondoh, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 287 days.

(21) Appl. No.: 13/271,521

(22) Filed: Oct. 12, 2011

(65) Prior Publication Data

US 2012/0093297 A1   Apr. 19, 2012

(30) Foreign Application Priority Data

Oct. 14, 2010 (JP) ................................ 2010-231609

(51) Int. Cl.
| | |
|---|---|
| *G02B 5/18* | (2006.01) |
| *G02B 27/44* | (2006.01) |
| *G03H 5/00* | (2006.01) |
| *G01T 1/29* | (2006.01) |
| *G21K 1/06* | (2006.01) |
| *G01D 5/38* | (2006.01) |

(52) U.S. Cl.
CPC .. *G21K 1/06* (2013.01); *G01D 5/38* (2013.01); *G21K 2207/005* (2013.01)
USPC .................. 378/36; 378/82; 359/11; 359/569

(58) Field of Classification Search
CPC ...... G02B 5/18; G02B 5/1844; G02B 5/1838; G02B 5/1842; G02B 5/1866; G02B 5/1871; G02B 27/44; G02B 27/50; G02B 27/52; G03H 5/00; G01T 1/29; G01T 1/2914
USPC ........... 378/2, 36, 710, 71, 82, 145, 204, 210; 250/370.01, 370.08, 370.09; 356/450, 356/496–499, 521, 614–618, 622, 239.2, 356/239.3, 237.6, 256; 359/1, 10, 11, 29, 359/30, 32, 227, 237, 238, 503, 558, 559, 359/566, 569, 577, 885, 896; 382/128, 132, 382/210, 280, 325
See application file for complete search history.

(56) References Cited

U.S. PATENT DOCUMENTS

| | | | |
|---|---|---|---|
| 7,564,941 B2 | 7/2009 | Baumann et al. | |
| 2010/0290590 A1* | 11/2010 | Ouchi et al. | ..................... 378/62 |
| 2011/0085639 A1* | 4/2011 | Nakamura et al. | .............. 378/62 |

FOREIGN PATENT DOCUMENTS

JP        2007-203064 A      8/2007

* cited by examiner

*Primary Examiner* — Anastasia Midkiff
(74) *Attorney, Agent, or Firm* — Canon USA Inc. IP Division

(57) ABSTRACT

An imaging apparatus includes, a diffraction grating that diffracts an electromagnetic wave emitted from an electromagnetic wave source, a shield grating including a shield portion that prevents transmission of the electromagnetic wave and a plurality of transmission portions that allows the electromagnetic wave to transmit therethrough, and a detector that detects the electromagnetic wave transmitted through the transmission portions of the shield grating. The diffraction grating forms an interference pattern in a grid pattern by diffracting the electromagnetic wave; the shield grating has the plurality of transmission portions arranged two-dimensionally; and a ratio of an area of the transmission portion to the area of a unit pattern composed of a portion of the shield portion and one transmission portion of the plurality of transmission portions is larger than 0.25.

19 Claims, 9 Drawing Sheets

PHASE REFERENCE PORTION ■
π SHIFT PORTION ▨
π/2 SHIFT PORTION ▦

IMAGING APPARATUS

BACKGROUND OF THE INVENTION

1. Field of the Invention

The present invention relates to an imaging apparatus using the Talbot interference method.

2. Description of the Related Art

The Talbot interference method is a method of obtaining a phase image of an object using interference of electromagnetic waves such as X-ray and light.

The principle of the Talbot interference method will be described. An imaging apparatus including an electromagnetic wave source, diffraction grating, shield grating, and detector is commonly used for the Talbot interference method. If an electromagnetic wave emitted from the electromagnetic wave source passes through an object, the phase of the electromagnetic wave changes depending on the refractive index and shape of the object. If the electromagnetic wave is diffracted by the diffraction grating, an interference pattern having phase information of the object is formed at specific positions called Talbot positions. By detecting the interference pattern using the detector and analyzing detection results, a differential phase image of the object can be obtained.

However, depending on a size of pitch of an interference pattern or a resolution of a detector, it may be difficult for the detector to detect the interference pattern. In such a case, a shiegrating is arranged at positions where the interference pattern is formed. The shield grating includes a shield portion that blocks electromagnetic waves and a transmission portion through which electromagnetic waves pass and forms a moire by shielding a portion of an interference pattern. A phase image of an object is obtained by detecting intensity information of the moire using a detector and analyzing the detection result.

An analysis method for obtaining a phase image of an object from a detection result of the detector using a Fourier transform is known. The analysis method will briefly be described. First, a Fourier transform of a detection result is performed to obtain a spatial frequency spectrum. Next, the spectrum of frequency of a fundamental period component (hereinafter referred to as the carrier frequency) of a moire and peripheral frequencies thereof are cut out and moved to the origin. A differential phase image of the object is obtained by performing an inverse Fourier transform of the frequency spectrum and further, a phase image of the object is obtained by integrating the differential phase image. In an imaging apparatus using the Talbot interference method, as described above, the shield grating is used to shield a first portion of the interference pattern and allow a second portion thereof to pass through.

Japanese Patent Application Laid-Open No. 2007-203064 (corresponding version: U.S. Pat. No. 7,564,941) discusses a shield grating used for a one-dimensional interference pattern in the Talbot interference method using X-ray (hereinafter referred to as the X-ray Talbot interference method). The arrangement of the shield portion and transmission portion of the shield grating corresponds to that of a bright portion and a dark portion of the interference pattern and the ratio of the width of the transmission portion to that of the shield portion is 1:1.

Generally, high intensity of the carrier frequency makes the differential phase image less susceptible to noise. Thus, to obtain a phase image of an object using the Talbot interference method, high intensity of the carrier frequency is desirable. However, the intensity of the carrier frequency is not sufficient in an imaging apparatus using the conventional two-dimensional Talbot interference method.

SUMMARY OF THE INVENTION

The present invention is directed to providing an imaging apparatus capable of increasing the intensity of the carrier frequency and obtaining an optimized phase image of an object in a two-dimensional Talbot interferometer.

According to an aspect of the present invention, an imaging apparatus includes a diffraction grating that diffracts an electromagnetic wave emitted from an electromagnetic wave source, a shield grating including a shield portion that prevents transmission of the electromagnetic wave and a plurality of transmission portions that allows the electromagnetic wave to transmit therethrough, and a detector that detects the electromagnetic wave transmitted through the transmission portions of the shield grating, wherein the diffraction grating forms an interference pattern in a grid pattern by diffracting the electromagnetic wave, the shield grating has the plurality of transmission portions arranged two-dimensionally, and a ratio of an area of the transmission portion to the area of a unit pattern composed of a portion of the shield portion and one transmission portion of the plurality of transmission portions is larger than 0.25.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Figure 1:
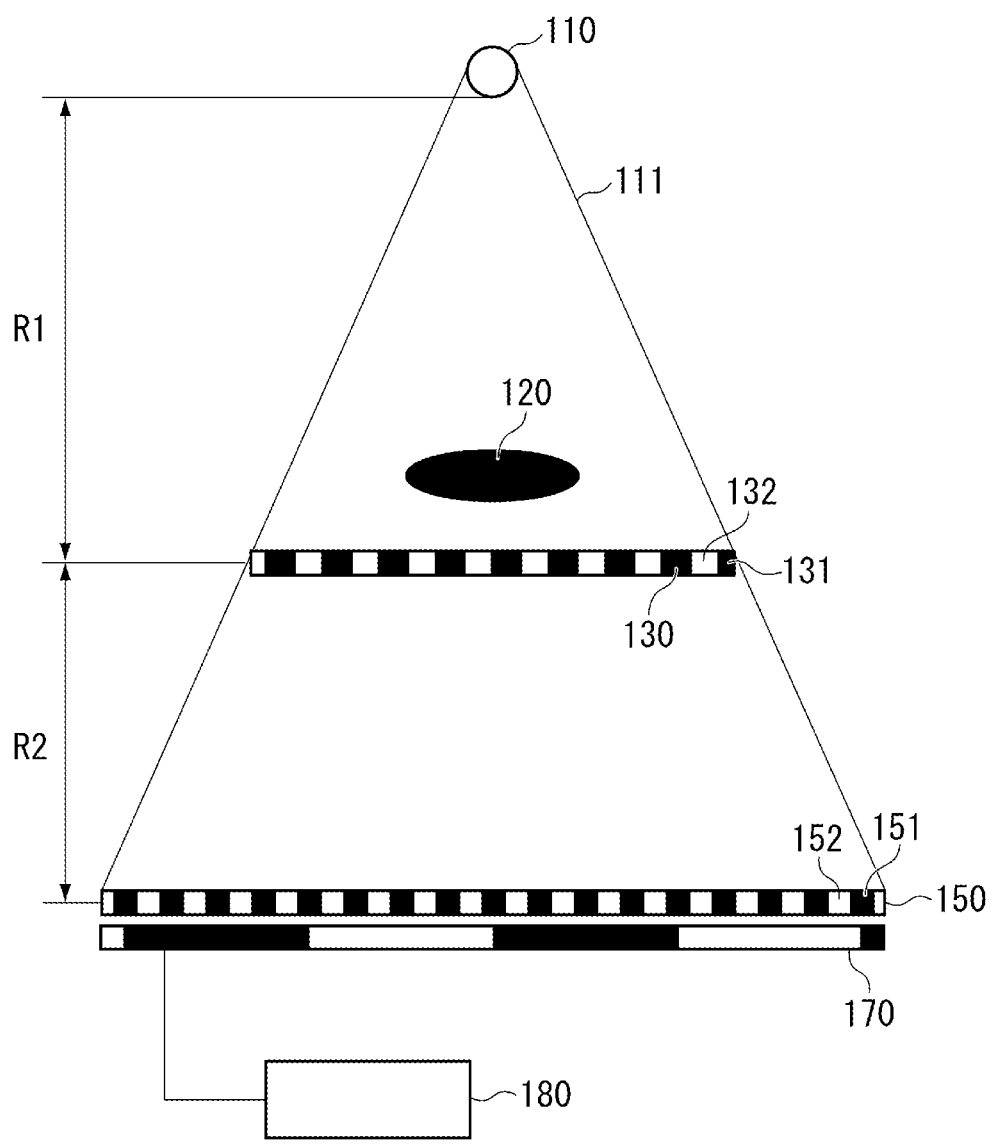
FIG. 1 is a schematic diagram of an X-ray imaging apparatus according to an exemplary embodiment of the present invention.

Various exemplary embodiments, features, and aspects of the invention will be described in detail below with reference to the drawings.

The inventors of the present invention discussed a shape and a size of the transmission portion of the shield grating for applying the two-dimensional Talbot interference method. As a result, it is possible to make the intensity of the carrier frequency of a moire greater than that in the past. The Talbot interference method in which a two-dimensional interference pattern is formed and a two-dimensional shield grating is used will herein be referred to as the two-dimensional Talbot interference method.

An exemplary embodiment of the present invention will be described in detail based on the appended drawings. The same reference numerals are attached to the same members in each figure and a duplicate description will not be repeated. In the present exemplary embodiment, an imaging apparatus applying the Talbot interference method using X-ray as electromagnetic waves will be described. The term "X-ray" herein refers to electromagnetic waves whose energy is in the range of 2 to 100 keV.

FIG. 1 is a schematic diagram of an X-ray imaging apparatus according to the present exemplary embodiment. The X-ray imaging apparatus illustrated in FIG. 1 includes an X-ray source 110, a diffraction grating 130 that diffracts X-ray from the X-ray source, a shield grating 150 that shields a portion of X-ray, a detector 170 that detects X-ray having passed through the shield grating, and an operation unit 180 that performs an operation based on a detection result of the detector. Furthermore, the imaging apparatus obtains a phase image of an object 120 by capturing a moire having phase information of the object 120. While the object 120 is placed between the X-ray source 110 and the diffraction grating 130 referring to FIG. 1, the object 120 may be placed between the diffraction grating 130 and the shield grating 150. Each structural element will be described below.

The X-ray source will be described. An X-ray imaging apparatus in the present exemplary embodiment includes an X-ray source as an electromagnetic wave source. When an X-ray 111 emitted from the X-ray source 110 passes through the object 120, the phase thereof changes depending on a refractive index and a shape of the object.

An X-ray source that emits continuous X-ray or an X-ray source that emits characteristic X-ray may be used as the X-ray source. A radiation source grating or wavelength selection filter to split X-ray into fine beams may be arranged on an X-ray path which is emitted from the X-ray source 110.

The diffraction grating will be described. The diffraction grating 130 forms an interference pattern composed of bright portions and dark portions by diffracting the X-ray 111. A location where the intensity of an electromagnetic wave is great is defined herein as a bright portion and a location where the intensity is small is defined as a dark portion. The diffraction grating 130 is arranged between the object 120 and the shield grating 150 in FIG. 1, but may be arranged between the X-ray source 110 and the object 120. In the diffraction grating 130, a phase reference portion 131 and a phase shift portion 132 are two-dimensionally arranged and the phase shift portion 132 allows the X-ray having passed through the phase reference portion 131 to pass through by shifting the phase thereof by a specific value.

A phase shift portion that shifts the phase so that a phase difference from the phase of an X-ray having passed through the phase reference portion 131 becomes $\pi$ radians is called a $\pi$ shift portion and a phase shift portion that shifts the phase so that a phase difference from the phase of an X-ray having passed through the phase reference portion 131 becomes $\pi/2$ radians is called a $\pi/2$ shift portion. The material constituting the diffraction grating 130 can be a material with high transmittance of X-ray and, for example, silicon may be used.

Figure 2:
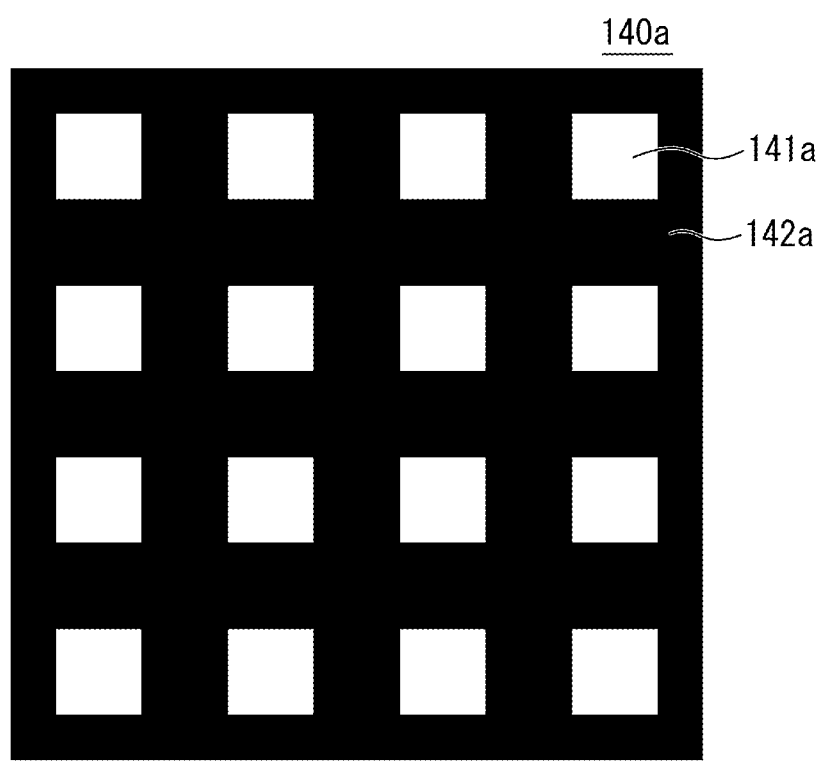
FIG. 2 is a schematic diagram of an interference pattern according to an exemplary embodiment of the present invention.

In the present exemplary embodiment, a diffraction grating that forms an interference pattern in a grid pattern is used. The interference pattern in a grid pattern is herein, as illustrated in FIG. 2 as an example, an interference pattern 140a in which a plurality of bright portions 141a is arranged by being enclosed with a dark portion 142a. A diffraction grating that forms an interference pattern in the grid pattern is herein defined as follows.

First, if the shape of the phase shift portion is a square and the interference pattern formed by an X-ray being diffracted by the diffraction grating thereof is in the grid pattern, the diffraction grating is defined as a diffraction grating that forms an interference pattern in the grid pattern.

On the other hand, if the phase shift portion forms a shape other than a square shape, first, the shape of the phase shift portion is assumed to be, among squares containing the phase shift portion, a square whose area is closest to the area of the actual phase shift portion. Next, if the interference pattern formed by an X-ray being diffracted by a diffraction grating having the phase shift portion in the assumed shape is in the grid pattern, the diffraction grating is considered as a diffraction grating forming an interference pattern in the grid pattern.

According to the above definition, for example, when a diffraction grating that forms an interference pattern in the grid pattern is created, the corner of the phase shift portion is rounded due to error in creation. Thus, a diffraction grating that actually forms an interference pattern in a non-grid pattern will also be called herein as a diffraction grating that forms an interference pattern in the grid pattern.

If the actual or assumed size of the square phase shift portion is only slightly different, an interference pattern in the grid pattern in which squares are arranged as illustrated in FIG. 2 is not formed. However, if the actual or assumed size of the square phase shift portion of the diffraction grating is 0.25 to 2.25 times the size of the phase shift portion of the diffraction grating that forms an interference pattern in the grid pattern as illustrated in FIG. 2, the diffraction grating is considered to form an interference pattern in the grid pattern. However, the arrangement of the phase reference portion and the phase shift portion needs to be like a diffraction grating that forms an interference pattern in the grid pattern as illustrated in FIG. 2. The size of the phase shift portion herein refers to the ratio of the size of the phase reference portion to that of the phase shift portion.

Figure 3B:
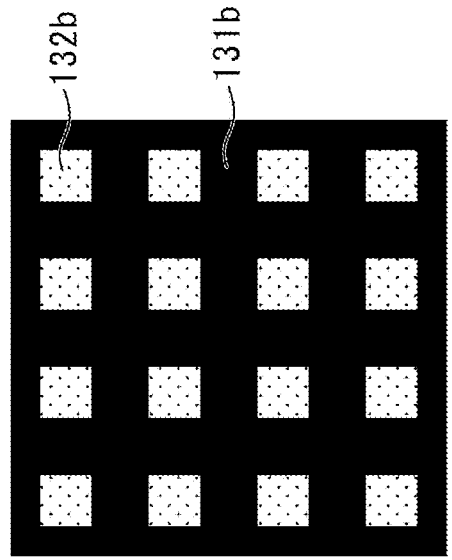
FIG. 3B is a schematic diagram of the diffraction grating according to an exemplary embodiment of the present invention.
Figure 3A:
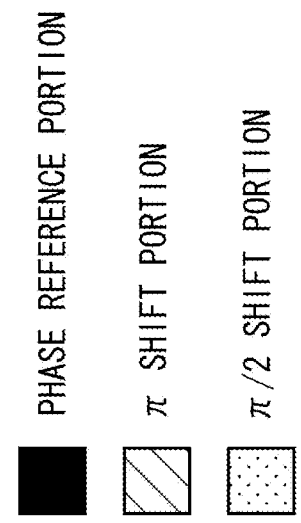
FIG. 3A is a schematic diagram of a diffraction grating according to an exemplary embodiment of the present invention.
Figure 3A:
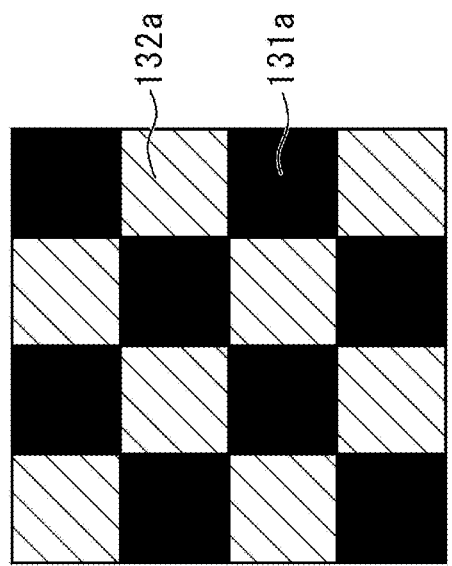
Figure 3C:
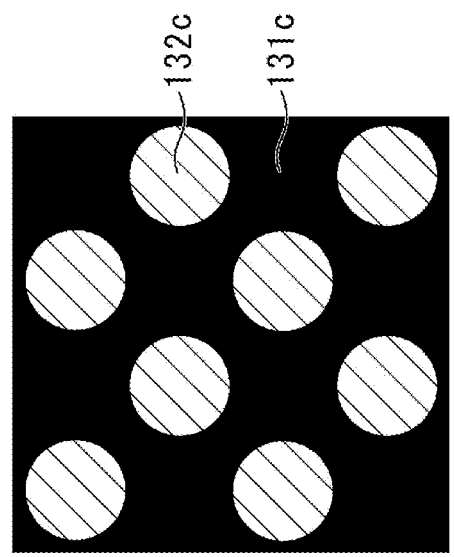
FIG. 3C is a schematic diagram of the diffraction grating according to an exemplary embodiment of the present invention.

Concrete examples of the diffraction grating used in the present exemplary embodiment are illustrated in FIGS. 3A to 3C. The diffraction grating illustrated in FIG. 3A or FIG. 3B may be used as a diffraction grating in which the shape of the phase shift portion is a square. The diffraction grating illustrated in FIG. 3A has a phase reference portion 131a and a π shift portion 132a arranged in a checkered pattern. However, the arrangement need not strictly be in a checkered pattern. While the area of the π shift portion of the diffraction grating illustrated in FIG. 3B is half that for one period of the diffraction grating, even if the area of the π phase shift portion as small as ⅛ that for one period of the diffraction grating, the diffraction grating is considered as a diffraction grating that forms an interference pattern in the grid pattern.

The diffraction grating illustrated in FIG. 3B has a phase reference portion 131b and a π/2 shift portion 132b arranged in the grid pattern. While the area of the π/2 shift portion of the diffraction grating illustrated in FIG. 3B is ¼ that for one period of the diffraction grating, if the area of the π/2 shift portion of the diffraction grating is in the range of ⅛ to 9/16 of the area for one period of the diffraction grating, the diffraction grating is considered as a diffraction grating that forms an interference pattern in the grid pattern.

The diffraction grating illustrated in FIG. 3C is cited as an example of the phase shift portion whose shape is other than a square. The diffraction grating illustrated in FIG. 3C includes a phase reference portion 131c and a π shift portion 132c and the π shift portion is circular. If the shape of the phase shift portion is not a square, as described above, among squares containing the actual phase shift portion, a square whose area is closest to the area of the actual phase shift portion is assumed.

In other words, for the diffraction grating in FIG. 3C, a square whose one side has a length equal to the length of the diameter of the circle of the phase shift portion and whose four sides are tangents of the circle is assumed to be the shape of phase shift portion of the diffraction grating in FIG. 3C. Then, the diffraction grating in FIG. 3C has the same shape as the diffraction grating in FIG. 3A.

Figure 9:
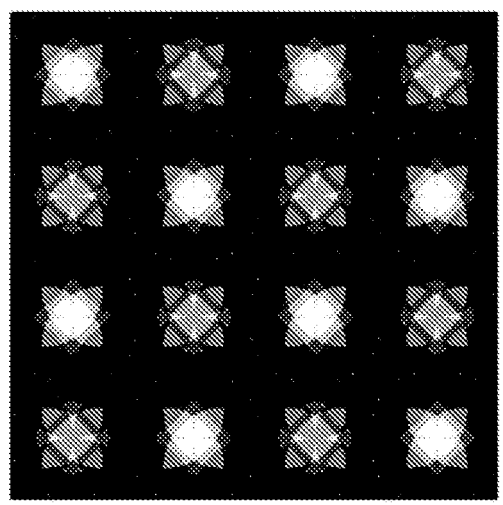
FIG. 9 is a schematic diagram of the interference pattern according to an exemplary embodiment of the present invention.

Since an interference pattern in the grid pattern is formed when an X-ray is diffracted by a diffraction grating having the phase shift portion of the assumed shape, the diffraction grating illustrated in FIG. 3C is also assumed herein to be a diffraction grating that forms an interference pattern in the grid pattern. The area of the assumed square phase shift portion is also assumed, just like when the actual phase shift portion is a square, to be a diffraction grating that forms an interference pattern in the grid pattern if the area is within the above range. However, an interference pattern actually formed by the diffraction grating illustrated in FIG. 3C, as illustrated in FIG. 9, is not a square with blurred bright portions and linear bright portions interspersed and so the shape thereof is not exactly a grid pattern.

The formation of interference patterns in the grid pattern is not limited to the diffraction gratings illustrated in FIGS. 3A to 3C and combinations of various radiation source gratings and phase gratings can be used to form such interference patterns.

The shield grating will be described. The shield grating 150 is arranged at a position where an interference pattern is formed and shields a portion of X-ray forming the interference pattern to form a moire.

The shield grating 150 includes a shield portion 151 and a plurality of transmission portions 152. If the shield portion shields X-ray to the extent that a moire is formed by being arranged at the position where an interference pattern is formed, the shield portion may be used in an imaging apparatus in the present exemplary embodiment even if X-rays are not completely shield.

Figure 4A:
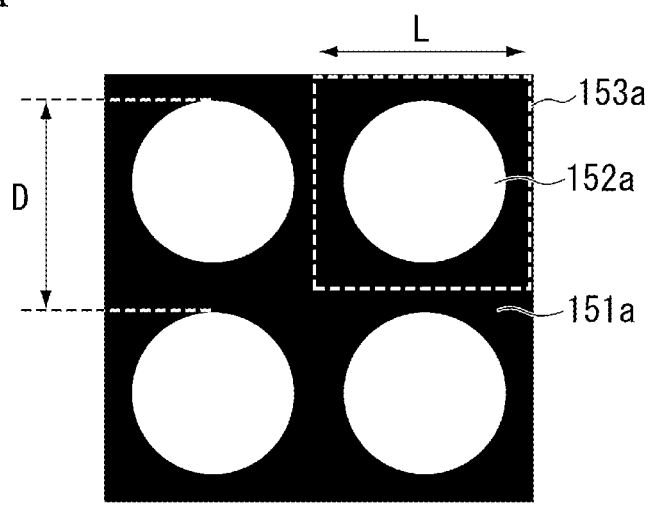
FIG. 4A is a schematic diagram of a shield grating according to an exemplary embodiment of the present invention.
Figure 4B:
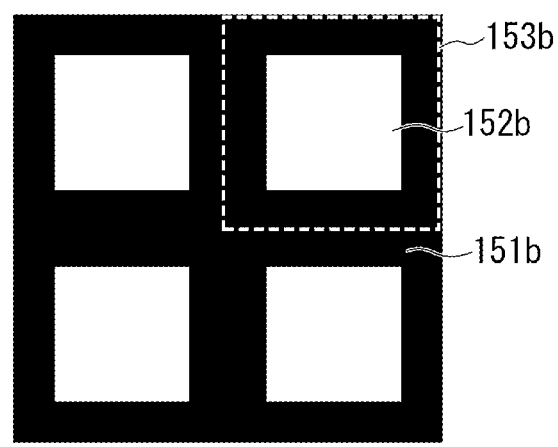
FIG. 4B is a schematic diagram of the shield grating according to an exemplary embodiment of the present invention.
Figure 4C:
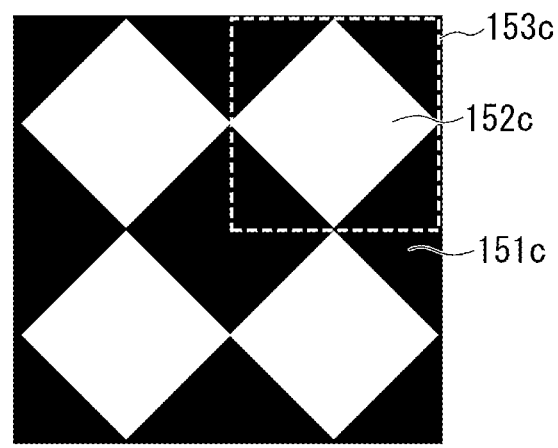
FIG. 4C is a schematic diagram of the shield grating according to an exemplary embodiment of the present invention.

FIGS. 4A to 4C illustrate schematic diagrams of the shield grating according to the present exemplary embodiment. The sectional shape of the transmission portion of the shield grating illustrated in FIG. 4A is circular, the sectional shape of the transmission portion of the shield grating in FIG. 4B is a square, and the sectional shape of the transmission portion of the shield grating in FIG. 4C is a shape obtained by inclining a square by 45° with respect to bright portions of an interference pattern. The sectional shape being a square means that, when the bright portion of an interference pattern is a square, the bright portion of an interference pattern and the inclination thereof match the sectional shape of the transmission portion of the shield grating. Similarly, the shape obtained by inclining a square by 45° refers to the shape in which, when the bright portion of an interference pattern is a square, the square is inclined by 45° with respect to the bright portion of an interference pattern.

If the bright portion of an interference pattern is not a square, like the definition of the area of the bright portion of an interference pattern described above, the bright portion of an interference pattern formed by assuming that the shape of the phase shift portion of a phase grating is a square and the inclination of the transmission portion of the shield grating may need to be considered. A moire may be formed by in-plane rotating the shield grating and in such a case, the inclination of the transmission portion is considered in a state before the in-plane rotation. The shape in which a square is inclined by 45° with respect to the bright portion of an interference pattern is herein called a rhombus and hereinafter, respective shield gratings will be called a circular shield grating, a square shield grating, and a rhombic shield grating corresponding to each sectional shape illustrated in FIG. 4A, FIG. 4B and FIG. 4C, respectively.

As illustrated in FIGS. 4A to 4C, squares having the length for one grating period of the shield grating as the length of one side thereof are referred to as unit patterns 153a, 153b, and 153c. The unit pattern will be described with reference to FIG. 4A. In FIG. 4A, the unit pattern 153a includes a part of the shield portion 151a of the shield grating and one transmission portion 152a and is set so that a length L of one side of the unit pattern 153a is equal to the length of a grid period D of the shield grating.

In a shield grating used in the present exemplary embodiment as illustrated in FIGS. 4A-4C, an area ratio of the area of the transmission portion (e.g., 152a, 152b or 152c) to the area of the unit pattern (e.g., 153a, 153b or 153c) is larger than 0.25. Here it should be noted that the area of the unit pattern includes a portion of the shield portion (e.g., 151a, 151b or 151c) and one transmission portion of the plurality of transmission portions included in the shield grating. Thus, the area ratio (or simply "ratio") is given as "area of the transmission portion" divided by "area of the unit pattern", where the ratio is larger than 0.25. When the area ratio of the transmission portion is larger than 0.71 and smaller than 0.75 and if a square or circular form is adopted as the shape of the transmission portion, the intensity of the carrier frequency is lower than that in the past and thus, the shape in which a square is inclined by 45° can be adopted.

Further, when the area ratio of the transmission portion is larger than 0.58 and smaller than 0.71, the intensity of the carrier frequency can be made greater than that in the past even if, in addition to the shape in which a square is inclined by 45°, a circular form is adopted. Further, when the area ratio of the transmission portion is larger than 0.25 and smaller than 0.58, the intensity of the carrier frequency can be made greater than that in the past by adopting any shape of a circular form, a square and a shape in which a square is inclined by 45° as illustrated in FIG. 4 as the shape of the transmission portion.

In the present exemplary embodiment, the area of the transmission portion of each of the circular shield grating, the square shield grating, and the rhombic shield grating satisfies the following conditions. In the unit pattern 153a of the circular shield grating, the area ratio of the area of the transmission portion 152a to the area of the unit pattern 153a (area of the transmission portion/area of the unit pattern, hereinafter referred to as the area ratio of the transmission portion) is larger than 0.25 and smaller than 0.71. In the unit pattern 153b of the square shield grating, the area ratio of the transmission portion 152b to the area of the unit pattern 153b is larger than 0.25 and smaller than 0.58. In the unit pattern 153c of the rhombic shield grating, the area ratio of the transmission portion 152c to the area of the unit pattern 153c is larger than 0.25 and smaller than 0.75.

For the circular shield grating and the rhombic shield grating, when the area ratio of the transmission portion exceeds a certain value, adjacent transmission portions come into contact with and are connected to each other. The rhombic shield grating illustrated in FIG. 4C is taken as an example. The area ratio of the transmission portion of the rhombic shield grating in FIG. 4C is 0.5 and adjacent transmission portions are in contact with each other. When the area ratio of the transmission portion is 0.5 or more, adjacent transmission portions are connected to each other and the shape of the transmission portion is no longer rhombic to be exact, but such shield gratings are also called herein as rhombic shield gratings and the transmission portion is considered as rhombic. However, for the calculation of the area ratio of the transmission portion, the actual area of the transmission portion is used. In other words, the area ratio of the transmission portion is not calculated using an area calculated under the assumption that the transmission portion is rhombic.

When the shape of the transmission portion of the shield grating is distorted, in other words, the transmission portion of the shield grating is not exactly square or circular, the shield grating can be used as a shield grating in the present exemplary embodiment. A substance that shields X-ray well can be a material constituting the shield portion and, for example, gold may be used. A substance that transmits X-ray well can be a material constituting the transmission portion and, for example, silicon may be used or the transmission portion may be hollow.

The grating period of the shield grating may be the same as the period of an interference pattern or slightly different. The period of an interference pattern herein, however, is defined as follows. When the X-ray is a plane wave, half the period of a phase grating is defined as the period of an interference pattern when the interference pattern is formed by the phase grating having a π shift portion and the period of the phase grating is defined as the period of an interference pattern when the interference pattern is formed by the phase grating having a π/2 shift portion. When the phase grating has a phase shift portion that shifts any other phase value, the period of an interference pattern formed under the assumption that the phase shift portion shifting the phase value is arranged in a checkered pattern exactly as illustrated in FIG. 3A as the period of an interference pattern.

If the X-ray is a spherical wave, the period of an interference pattern is obtained by multiplying the period of an interference pattern when the X-ray is a plane wave by (R1+R2)/R1. Where, R1 is the distance from the X-ray source to the diffraction grating and the R2 is the distance from the diffraction grating to the shield grating. When the grating period of the shield grating and the period of an interference pattern are the same, a moire is caused by in-plane rotating the shield grating 150. When the grating period of the shield grating and the period of an interference pattern are slightly different, a moire is caused without in-plane rotation. The grating period of the shield grating may be greater or smaller than the period of an interference pattern, but a greater grating period of the shield grating may be useful since it can be manufactured easier from the viewpoint of manufacturing the shield grating. When the grating period of the shield grating is equal to or greater than the period of an interference pattern, the area of the transmission portion of the shield grating becomes larger than the area of a bright portion of an interference pattern. The area of a bright portion of an interference pattern herein is defined as ¼ of the area of a square whose one side is equal to the length of the period of the interference pattern.

The detector will be described. A moire formed by X-ray having passed through the shield grating 150 is detected by the detector 170. In the present exemplary embodiment, the detector 170 is an image sensor capable of capturing X-ray and, for example, a Flat Panel Detector (FPD) or Charge Coupled Device (CCD) capable of conversion into a digital signal can be used.

Figure 5:
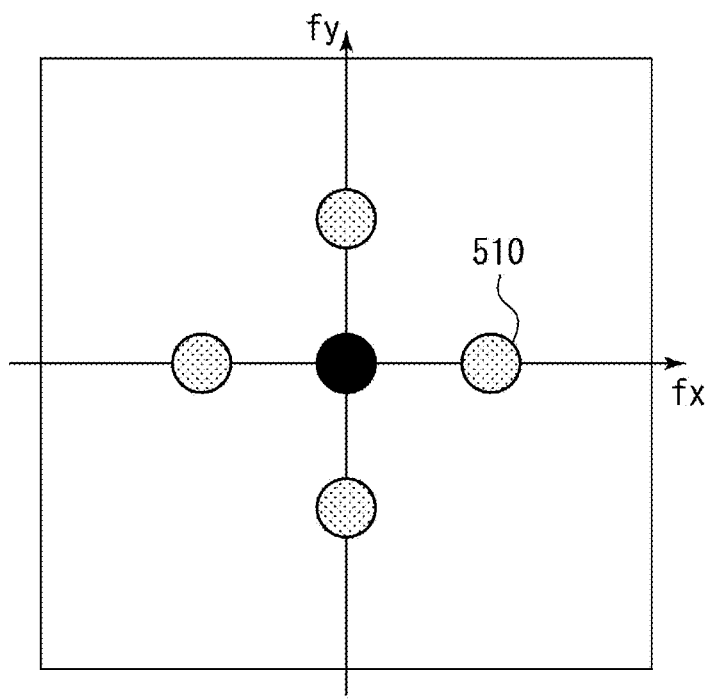
FIG. 5 is a schematic diagram of a spatial frequency spectrum according to an exemplary embodiment of the present invention.

The operation unit will be described. The operation unit 180 first calculates a spatial frequency spectrum by performing a Fourier transform of the moire detected by the detector 170. FIG. 5 is a schematic diagram of a spatial frequency spectrum obtained in the present exemplary embodiment. Next, the operation unit 180 performs phase retrieval processing from a peak 510 of the carrier frequency in the spatial frequency spectrum. The operation unit 180 includes, for example, a Central Processing Unit (CPU). An X-ray imaging apparatus in the present exemplary embodiment includes an operation unit, but if a Fourier transform and phase retrieving processing can be performed based on information detected by the detector, the operation unit and the X-ray imaging apparatus may be provided separately. An X-ray imaging system may be configured by connecting an image display apparatus that displays an image based on operation results by the operation unit to an X-ray imaging apparatus. An X-ray imaging apparatus containing an operation unit and an image display apparatus that displays an image based on operation results by the operation unit together are called an X-ray imaging system.

The first exemplary embodiment will be described. In the first exemplary embodiment, an X-ray imaging apparatus using a diffraction grating in which the phase shift portion is square will be described. How the intensity of the carrier frequency changes when the X-ray imaging apparatus configured as described below is used for imaging by changing the area ratio of the transmission portion of the shield grating is calculated by a simulation. The calculation is made by dividing a region of 64×64 μm² into 8192×8192 meshes.

A monochromatic plane wave of 17.5 KeV is used as the X-ray. Since the intensity of one mesh is defined as 1, the whole calculation region has the intensity of 8192×8192=67108864. The unit may be arbitrary unit.

The diffraction grating illustrated in FIG. 3A in which the phase reference portion 131a and the π shift portion 132a arranged in a checkerboard pattern are used as the diffraction grating. The material thereof is silicon, the grating period is 4 μm, and the thickness is 22.4 μm. An interference pattern in the grid pattern whose period is 2 μm is formed by the diffraction grating.

Three kinds of shield grating, a circular shield grating, square shield grating, and rhombic shield grating as illustrated in FIGS. 4A, 4B, and 4C are used as shield gratings. The material of each shield grating is silicon in the transmission portion and gold in the shield grating, the grating period is 2 μm, and the thickness is 50 μm. Each shield grating is in-plane rotated only by 0.125 radians to form a moire whose period is 16 μm. In the unit pattern of each shield grating, the area ratio of the transmission portion is changed from 0.2 to 0.8.

A detector whose resolution is 4 μm is used as the detector. The intensity integrating 512×512 meshes is defined as intensity for one pixel of the detector. Thus, the number of pixels of the detector is 16×16 and one period of a moire is four pixels on the detector.

The peak intensity of the carrier frequency is determined from a spatial frequency spectrum obtained by performing Fast Fourier Transform (FFT) processing of a detection result obtained by the detector.

A second exemplary embodiment will be described. In the second exemplary embodiment, an X-ray imaging apparatus using a diffraction grating in which the phase shift portion is circular will be described. Other structural elements than the diffraction grating and the simulation method are the same as those in the first exemplary embodiment.

The diffraction grating illustrated in FIG. 3C is used. The diffraction grating illustrated in FIG. 3C has a circular π shift portion arranged by being inclined by 45° with respect to the vertical axis and the horizontal axis. The material thereof is silicon, the grating period is 4 μm, and the thickness is 22.4 μm A first comparative example will be described. As the first comparative example, the intensity of the carrier frequency of the X-ray imaging apparatus using the same diffraction grating as in the first exemplary embodiment and a shield grating conventionally used for the diffraction grating is calculated by a simulation. An X-ray imaging apparatus having the same structure as those in the first exemplary embodiment other than the shield grating is used.

Figure 6:
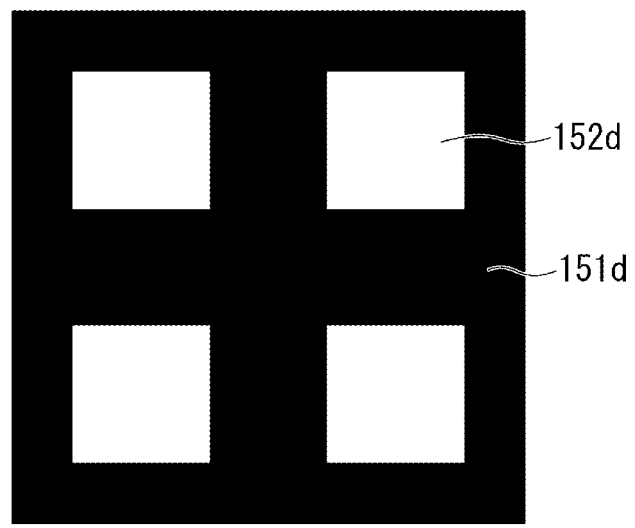
FIG. 6 is a schematic diagram of a conventionally used shield grating.

As described above, the shield grating discussed in Japanese Patent Application Laid-Open No. 2007-203064 has the shield portion and the transmission portion arranged corresponding to the arrangement of the bright portion and the dark portion of an interference pattern and the ratio of the width of the transmission portion to that of the shield portion is 1:1. Following this example, a shield grating in which the transmission portion and the shield portion are arranged correspondingly to the arrangement of the bright portion and the dark portion of an interference pattern may also be used in the two-dimensional Talbot interference method. Also in this case, the ratio of the width of the transmission portion of the shield grating to that of the shield portion thereof is 1:1. In the first comparative example, a shield grating illustrated in FIG. 6 in which the shape of a transmission portion 152d is square, the area ratio of the transmission portion is 0.25, and the grating period is 2 μm is used. Reference numeral 151d is a shield portion. The material thereof is silicon in the transmission portion and gold in the shield portion and the thickness is 50 μm. The shield grating is in-plane rotated only by 0.125 radians to form a moire whose period is 16 μm.

A second comparative example will be described. As the second comparative example, the intensity of the carrier frequency of the X-ray imaging apparatus using the same diffraction grating as in the second exemplary embodiment and a shield grating conventionally used for the diffraction grating is calculated by a simulation. An X-ray imaging apparatus having the same structure as those in the second exemplary embodiment other than the shield grating is used.

The shield grating will be described. Similar to the first comparative example, a shield grating illustrated in FIG. 6 in which the shape of a transmission portion 152d is square, the area ratio of the transmission portion is 0.25, and the grating period is 2 μm is used also in the second exemplary embodiment. Reference numeral 151d is a shield portion. The material thereof is silicon in the transmission portion and gold in the shield portion and the thickness is 50 μm. The shield grating is in-plane rotated only by 0.125 radians to form a moire whose period is 16 μm.

Results of the above simulation will be described. In the first exemplary embodiment, simulation results when each shield grating is used are illustrated as a graph in FIG. 7. The graph in FIG. 7, the vertical axis indicates the intensity of the carrier frequency and the horizontal axis indicates the area ratio of the transmission portion, and illustrates the relationship between the intensity of the carrier frequency and the area ratio of the transmission portion. The intensity of the carrier frequency obtained by the configuration of the first comparative example is illustrated as a straight line 710 in FIG. 7.

Figure 8:
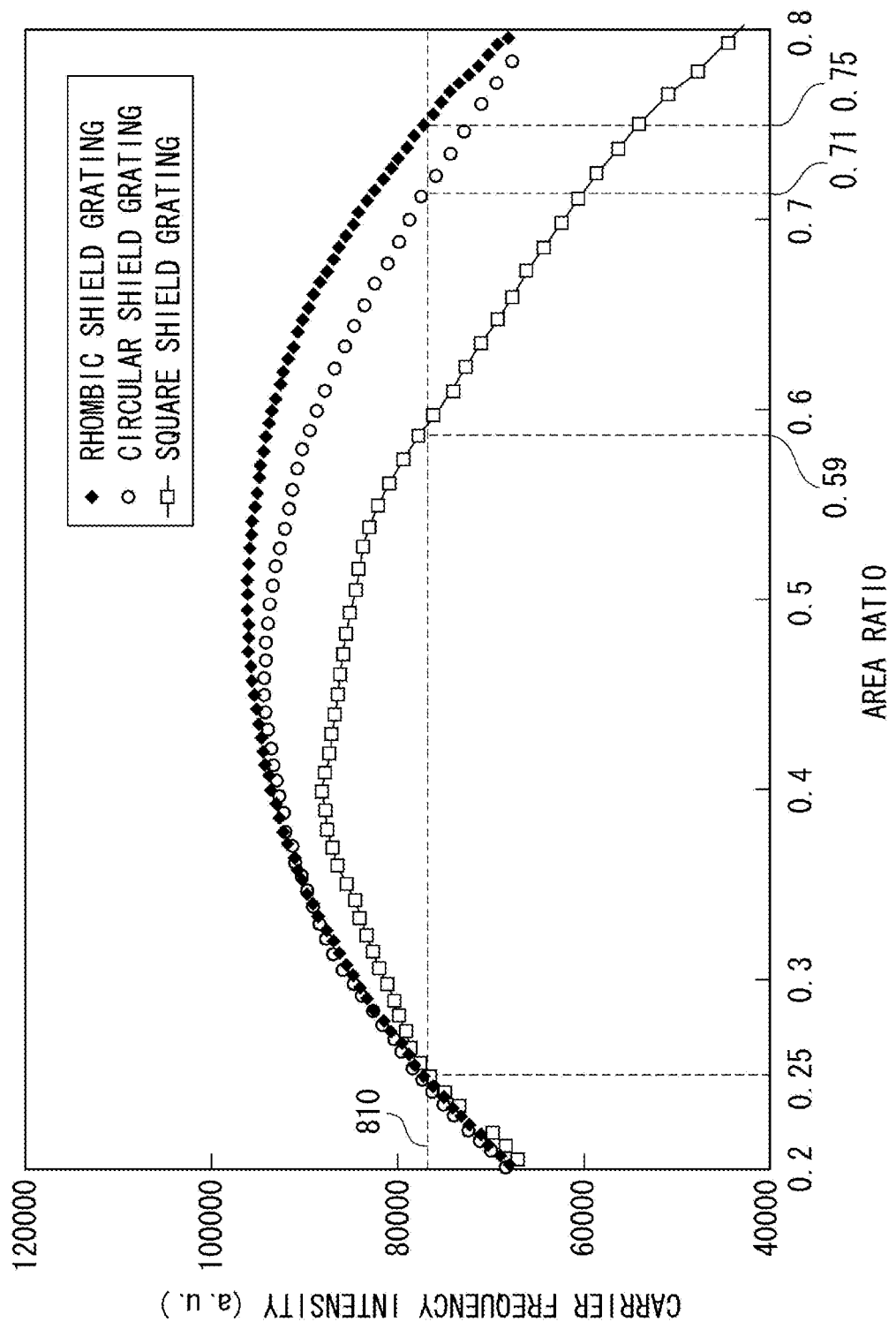
FIG. 8 is a graph illustrating the relationship between the area ratio of the transmission portion of the shield grating and intensity of the carrier frequency in a second exemplary embodiment of the present invention.

For the second exemplary embodiment, simulation results are illustrated as a graph in FIG. 8 similarly. In FIG. 8, the vertical axis indicates the intensity of the carrier frequency and the horizontal axis indicates the area ratio of the transmission portion. Also in FIG. 8, the intensity of the carrier frequency obtained with the configuration of the second comparative example is illustrated as a straight line 810.

Figure 7:
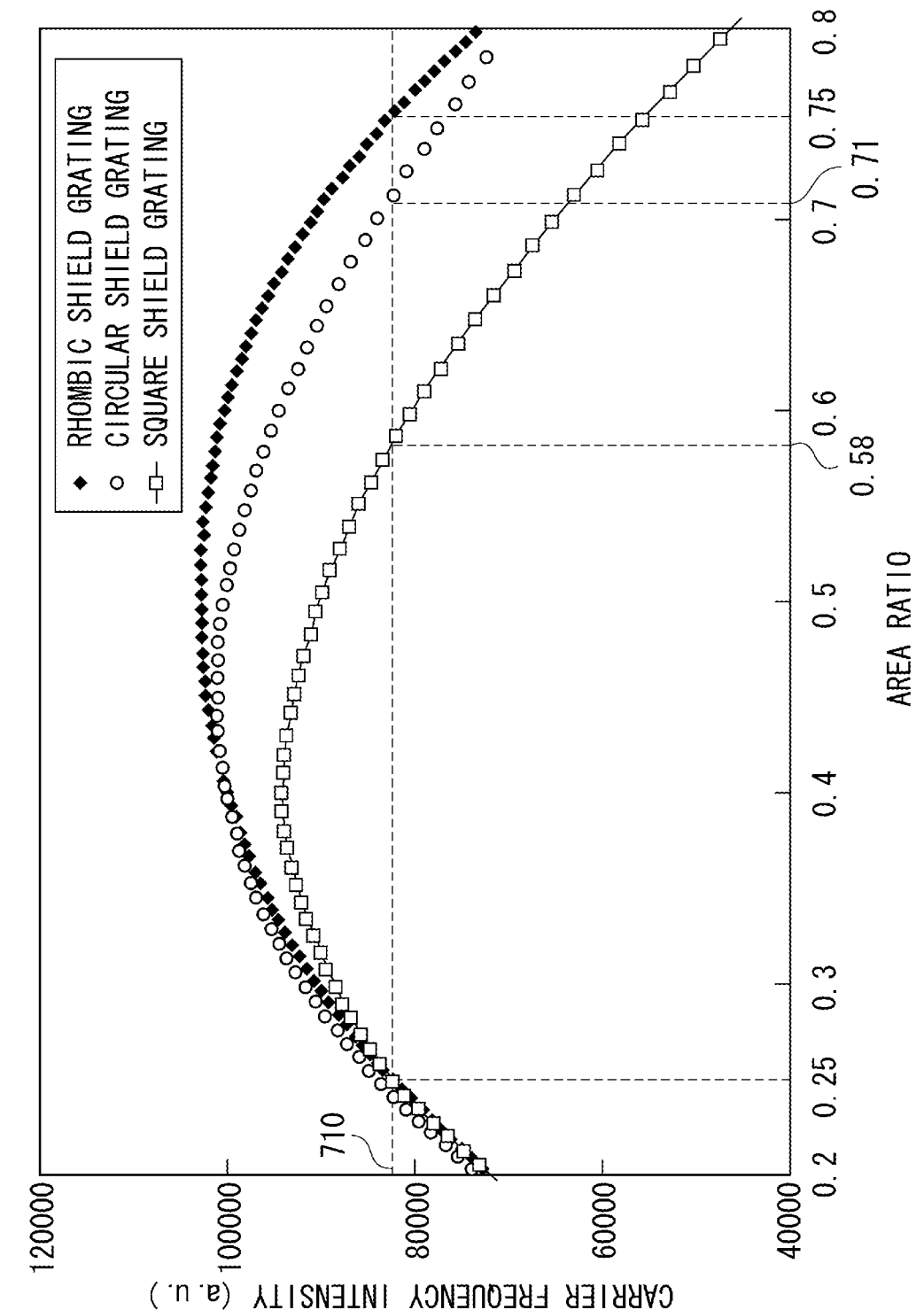
FIG. 7 is a graph illustrating a relationship between an area ratio of a transmission portion of the shield grating and intensity of the carrier frequency in a first exemplary embodiment of the present invention.

It is evident from FIGS. 7 and 8 that carrier frequencies whose intensities are greater than those in the first and the second comparative examples can be obtained when the area ratio of the transmission portion is larger than 0.25. The upper limit of the area of the transmission portion with which the carrier frequency whose intensities are greater than those in the first and the second comparative examples depends on the shape of the transmission portion. It is evident from FIGS. 7 and 8 that at least in the range in which the area ratio of the transmission portion is smaller than 0.75, there is a shape of the transmission portion with which a carrier frequency whose intensities are greater than those in the first and the second comparative examples can be obtained.

For the circular shield grating, it is evident that carrier frequencies whose intensities are greater than those in the first and second comparative examples can be obtained when the area ratio of the transmission portion is in the range larger than 0.25 and smaller than 0.71. When the square shield grating is used, carrier frequencies whose intensities are greater than those in the first and second comparative examples can similarly be obtained when the area ratio of the transmission portion is in the range larger than 0.25 and smaller than 0.58. For the rhombic shield grating, carrier frequencies whose intensities are greater than those in the first and second comparative examples can similarly be obtained in the range larger than 0.25 and smaller than 0.75.

Further, FIGS. 7 and 8 illustrate that there is a shape with which a carrier frequency whose intensities are greater than those in the first and the second comparative examples by about 100 or more can be obtained when the area ratio of the shield grating is in the range larger than 0.30 and smaller than 0.70. For the peak intensity of the carrier frequency to be greater than that in the first and the second comparative examples by about 10% or more, the area ratio of the transmission portion of each of the circular shield grating, square shield grating, and rhombic shield grating needs to be in the following range. For the circular shield grating, carrier frequencies whose intensities are greater than those in the comparative examples by about 10% or more can be obtained when the area ratio of the transmission portion is in the range larger than 0.30 and smaller than 0.63.

For the square shield grating, carrier frequencies whose intensities are greater than those in the comparative examples by about 10% or more can be obtained when the area ratio of the transmission portion is in the range larger than 0.33 and smaller than 0.48. For the rhombic shield grating, carrier frequencies whose intensities are greater than those in the comparative examples by about 10% or more can be obtained when the area ratio of the transmission portion is in the range larger than 0.30 and smaller than 0.70. If the transmission portion of the shield grating is in these ranges, more desirable intensity of the carrier frequency can be obtained in the two-dimensional Talbot interference method.

Further, FIGS. 7 and 8 illustrate that there is a shape with which a carrier frequency whose intensities are greater than those in the first and second comparative examples by about 200 or more can be obtained when the area ratio of the transmission portion is in the range larger than 0.35 and smaller than 0.65. For the circular shield grating, carrier frequencies whose intensities are greater than those in the first and the second comparative examples can be obtained when the area ratio of the transmission portion is in the range larger than 0.35 and smaller than 0.60. For the rhombic shield grating, carrier frequencies whose intensities are greater than those in the first and the second comparative examples by about 200 or more can be obtained when the area ratio of the transmission portion is in the range larger than 0.35 and smaller than 0.65. If the transmission portion of the shield grating is in these ranges, more desirable intensity of the carrier frequency can be obtained in the two-dimensional Talbot interference method.

From these simulation results, when the area ratio of the transmission portion is in the range larger than 0.25 and smaller than 0.58, carrier frequencies whose intensities are greater than that achievable by conventional technology are considered to be obtainable even when the transmission portion has a shape other than the above three shapes.

For example, the shape of the transmission portion may be a shape between rhombic/square and circular after a rhombus or square being rounded off or straight lines being distorted. Thus, when the area ratio of the transmission portion is in the above ranges, the shape of the transmission portion does not have to be produced exactly. Furthermore the area ratio of the transmission portion in the range larger than 0.33 and smaller than 0.48 can be more useful. When the area ratio is in this range, the peak intensity of the carrier frequency is considered to be 10% more than in the first and the second comparative examples which are conventional examples even if the transmission portion has the above shape in which a rhombus or square is rounded off. As a result, noise resistance more appropriate than that in the first and the second comparative examples can be obtained for the two-dimensional Talbot interference method.

When the area ratio of the transmission portion is increased, effects of the transmittance distribution of a object contained in detection results by the detector and non-uniformity of the X-ray source may also be increased. In such a case, if a shield grating in the present exemplary embodiment is used for imaging according to the method discussed in International Application No. PCT/JP2011/051680, the intensity of the carrier frequency can be increased while effects of the transmittance distribution of the object and non-uniformity of the X-ray source being suppressed.

An imaging apparatus using X-ray have been described in the present exemplary embodiment, but other electromagnetic waves than X-ray may be used for the present invention.

An exemplary embodiment of the present invention has been described, but the present invention is not limited to the above exemplary embodiment and may be altered or modified within the spirit and scope thereof.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-231609 filed Oct. 14, 2010, which is hereby incorporated by reference herein in its entirety.

What is claimed is:

1. An imaging apparatus comprising:
   a diffraction grating that diffracts an electromagnetic wave emitted from an electromagnetic wave source;
   a shield grating including a shield portion that prevents transmission of the electromagnetic wave and a plurality of transmission portions that allows the electromagnetic wave to transmit therethrough; and
   a detector that detects the electromagnetic wave transmitted through the transmission portions of the shield grating, wherein
   the diffraction grating forms an interference pattern in a grid pattern by diffracting the electromagnetic wave,
   the shield grating has the plurality of transmission portions arranged two-dimensionally, and
   a ratio of an area of the transmission portion to the area of a unit pattern composed of a portion of the shield portion and one transmission portion of the plurality of transmission portions is larger than 0.25.

2. The imaging apparatus according to claim 1, wherein the ratio of the area of the transmission portion to the area of the unit pattern is larger than 0.25 and smaller than 0.75.

3. The imaging apparatus according to claim 1, wherein
   each of the plurality of transmission portions has a circular sectional shape, and
   the ratio of an area of the transmission portion to the area of a unit pattern composed of a portion of the shield portion and one transmission portion of the plurality of transmission portions is larger than 0.25 and smaller than 0.71.

4. The imaging apparatus according to claim 1, wherein
   each of the plurality of transmission portions has a square sectional shape, and
   the ratio of an area of the transmission portion to the area of a unit pattern composed of a portion of the shield portion and one transmission portion of the plurality of transmission portions is larger than 0.25 and smaller than 0.58.

5. The imaging apparatus according to claim 1, wherein
   each of the plurality of transmission portions has a sectional shape obtained by inclining a square by 45° with respect to each of a plurality of bright portions of the interference pattern, and
   the ratio of an area of the transmission portion to the area of a unit pattern composed of a portion of the shield portion and one transmission portion of the plurality of transmission portions is larger than 0.25 and smaller than 0.75.

6. The imaging apparatus according to claim 1, wherein the ratio of the area of the transmission portion to the area of the unit pattern is larger than 0.25 and smaller than 0.58.

7. The imaging apparatus according to claim 1, wherein the ratio of the area of the transmission portion to the area of the unit pattern is larger than 0.30 and smaller than 0.48.

8. The imaging apparatus according to claim 1, wherein the electromagnetic wave source is an X-ray source and the electromagnetic wave includes X-ray radiation.

9. The imaging apparatus according to claim 1, wherein the diffraction grating includes a phase reference portion and a π shift portion,
- the π shift portion allows the electromagnetic wave to transmit by shifting a phase so that a phase difference from the phase of the electromagnetic wave having transmitted the phase reference portion become π radians, and
- the phase reference portion and the it shift portion are arranged in a checkerboard pattern.

10. The imaging apparatus according to claim 1, wherein the diffraction grating includes a phase reference portion and a π/2 shift portion,
- the π/2 shift portion allows the electromagnetic wave to transmit by shifting a phase so that a phase difference from the phase of the electromagnetic wave having transmitted the phase reference portion become π/2 radians, and
- the phase reference portion and the π/2 shift portion are arranged in a grid pattern.

11. The imaging apparatus according to claim 1, further comprising an operation unit that operates information about an object based on detection results by the detector.

12. An imaging system comprising:
- the imaging apparatus according to claim 11; and
- an image display apparatus connected to the imaging apparatus, wherein
- the image display apparatus displays an image based on operation results by the operation unit included in the imaging apparatus.

13. The imaging apparatus according to claim 1, wherein the shield grating has a same period in two directions.

14. The imaging apparatus according to claim 13, further comprising an operation unit that operates information about an object based on detection results by the detector.

15. The imaging apparatus according to claim 9, wherein the X-ray radiation is a spherical wave.

16. An imaging apparatus comprising:
- a diffraction grating that diffracts an electromagnetic wave emitted from an electromagnetic wave source;
- a shield grating including a shield portion that prevents transmission of the electromagnetic wave and a plurality of transmission portions that allows the electromagnetic wave to transmit therethrough; and
- a detector that detects the electromagnetic wave transmitted through the transmission portions of the shield grating,
- wherein the diffraction grating forms an interference pattern on the shield grating by diffracting the electromagnetic wave,
- wherein the interference pattern is a grid pattern which includes a plurality of bright portions,
- wherein the shield grating has the plurality of transmission portions arranged two-dimensionally, and
- wherein an area of each of the plurality of transmission portions is larger than an area of each of the plurality of bright portions.

17. The imaging apparatus according to claim 16, wherein the shield grating has a same period in two directions.

18. The imaging apparatus according to claim 16, wherein the X-ray radiation is a spherical wave.

19. An imaging system comprising:
- the imaging apparatus according to claim 16; and
- an image display apparatus connected to the imaging apparatus,
- wherein the image display apparatus displays an image based on operation results by the operation unit included in the imaging apparatus.

* * * * *